United States Patent [19]

Rowell

[11] 3,874,114
[45] Apr. 1, 1975

[54] PLANTBED COVER ASSEMBLY

[76] Inventor: Narvell E. Rowell, R.R. 1, Commiskey, Ind. 47227

[22] Filed: Sept. 26, 1973

[21] Appl. No.: 400,823

[52] U.S. Cl............................. 47/29, 47/17, 47/19, 49/74, 98/110
[51] Int. Cl....... A01g 13/04, A01g 9/24, E06b 7/08
[58] Field of Search............... 47/26, 28, 29, 30, 31, 47/17, 19; 49/74, 77, 371; 98/110

[56] References Cited
UNITED STATES PATENTS

| 673,810 | 5/1901 | Yancey | 47/28 |
| 874,218 | 12/1907 | Lutz | 47/28 |
| 1,092,094 | 3/1914 | Darroch | 98/110 X |
| 1,283,338 | 10/1918 | Simon | 47/17 UX |
| 2,046,601 | 7/1936 | Atkinson | 47/17 |
| 2,206,478 | 7/1940 | Hennessey | 47/17 X |
| 2,743,720 | 5/1956 | Dollinger | 49/77 X |
| 3,120,035 | 2/1964 | Morris | 98/110 X |

FOREIGN PATENTS OR APPLICATIONS

| 72,448 | 4/1951 | Denmark | 47/17 |
| 2,955 | 2/1915 | United Kingdom | 47/29 |
| 4,422 | 10/1955 | Germany | 47/26 |
| 812,097 | 4/1937 | France | 47/29 |
| 63,212 | 10/1891 | Germany | 47/17 |
| 825,762 | 3/1938 | France | 47/17 |

Primary Examiner—Edgar S. Burr
Assistant Examiner—Steven A. Bratlie
Attorney, Agent, or Firm—Woodard, Weikart, Emhardt & Naughton

[57] ABSTRACT

Disclosed is a plantbed cover composed of two rectangular frames hinged together along one side margin and at their corners adapted to be fastened so that their hinged margin is above the opposite side margins which are spaced above the plantbed level. Hinged skirts depend from the frame side margins, and extending transversely across the frames are parallel, transversely curved vanes of light transmitting (translucent or colorless) plastic. The vanes are moveable, in unison, about their longitudinal axis to vary exposure of the bed.

3 Claims, 8 Drawing Figures

PLANTBED COVER ASSEMBLY

BACKGROUND OF THE INVENTION

In the culture of tobacco plants it is customary to start the plants in prepared beds, with planting of the beds occuring as early as possible in the spring. Approximately six to eight weeks after planting, the plants are removed, or "pulled," from the small nurturing beds and reset in the fields, maintaining optimum spacing between plants, etc. The structure of the present invention protects and controls the access of rain, sleet, frost, etc. to the prepared nurturing beds both before and after planting and during the period before "pulling" or transplanting of the tobacco plants. The light transmitting (translucent or colorless) plastic vanes, transversely curved, which form the cover panels are moveable between open and closed position. When closed they permit convection circulation of air within the space over the bed. The vanes, in closed position, promote a humid, sunwarmed atmosphere over the plants which increases the plant growth rate.

DESCRIPTION OF THE PREFERRED EMBODIMENT

Figure 1:
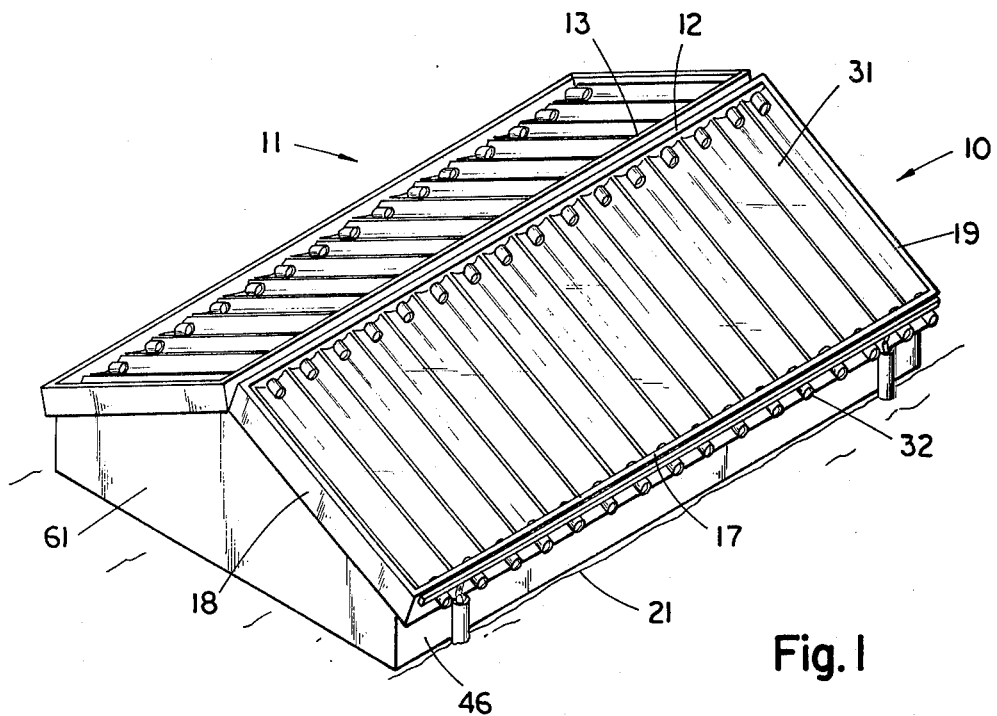
FIG. 1 is a perspective view of a plantbed cover assembly embodying the present invention.

Referring initially to FIG. 1 there is shown a plantbed cover embodying the present invention which in general, is formed by two frame members 10 and 11 hingedly joined to each other along their upper side margins 12 and 13 respectively. The hinges joining the marginal side members of the frames 10 and 11 are shown in FIG. 8 and there identified at 16. As may be seen in FIG. 8 a flexible member such as a cord or chain 14 limits the angular spread between the frame members. The two frames 10 and 11 are duplicates and frame 10, for example, may be seen to be composed of frame members 12 and 17 which extend parallel to each other and end frame members 18 and 19 rigidly joined to the longitudinal frame members. The hinged margins 12 and 13 of the frames 10 and 11 are disposed above the free marginal side members (17 in the case of frame 10) so that the frames lie in oppositely inclined planes over the plantbed whose general level is indicated at 21 in FIG. 1 and 7.

Figure 2:
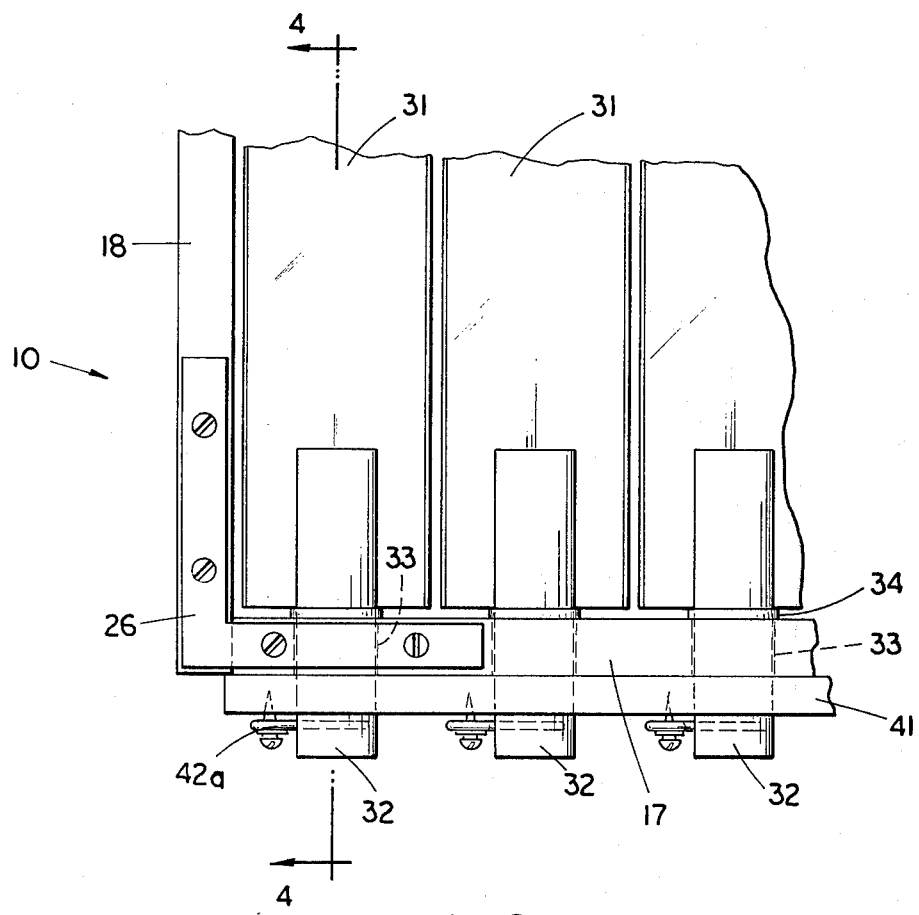
FIG. 2 is a fragmentary, top plan view of a portion of the structure shown in FIG. 1.

As may be seen in FIG. 2 the frame members are rigidly joined by any suitable means such as the metal L-shaped brackets 26. As may be seen in FIGS. 1 and 2, the frame 10 and, it will be understood, similarly the frame 11 carries a series of narrow vanes 31 which are arcuate in cross section and are formed of a rigid, plastic material, preferably acrylic plastic and translucent or colorless, the vanes being illustrated in their closed position in which their concave face is up, in FIGS. 1, 2 and 3.

The vanes 31 are arranged parallel to each other and are supported in the frame by tubular support members 32. The tubular support members may be formed of suitable plastic pipe and are slotted to accommodate the end portion of the respective vane 31 and the vane is rigidly fastened to the tube by solvent bonding or any other suitable means. The support members or tubes 32 extend freely through journalling apertures 33 in the frame members 17 (as viewed in FIG. 2) and the ends of the vanes 31 are held spaced from the frame members by means of the arcuate spacer rings 34.

Figure 3:
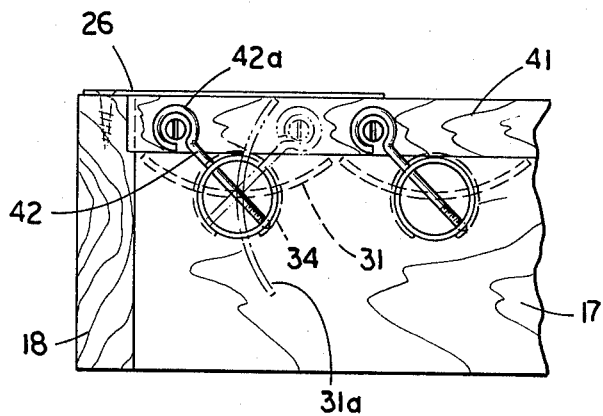
FIG. 3 is a fragmentary, side view of the structure shown in FIG. 2.
Figure 4:
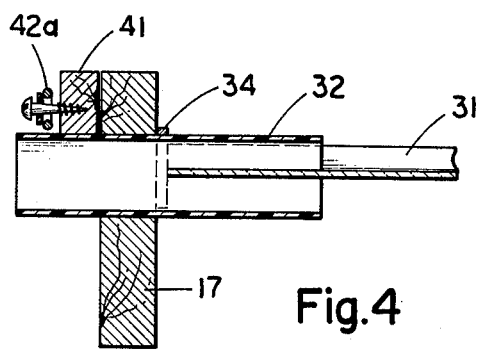
FIG. 4 is a fragmentary sectional view taken generally along the line 4—4 of FIG. 2.

The vanes 31 are movable in unison from a closed position in which their concave face is upward to an open position in which the vanes are arranged with their concave face rightwardly as shown in broken lines, identified at 31a, in FIG. 3. The means for moving the vanes in unison between these two positions will now be described with reference to FIGS. 2, 3 and 4. The vane displacing means includes a throw bar 41, which may be formed of wood, and extends parallel to and closely adjacent the frame side member 17 but rests on the vane support members 32 as will be evident from FIG. 3. The throw bar 41 has pivotally attached to it the eyelet head 42a, of a pin member 42 the shank portion of each of the pins extending at an acute angle from the throw bar 41. As will be evident from FIG. 3, the pins are rigidly secured to the vane support members by extending the pins diametrically through the vane support tubes 32. Keeping in mind that the eyeleted head 42a of each of the pins 42 is free to pivot with relation to the throw bar 41, as the throw bar 41 is moved upwardly and longitudinally to the right (as viewed in FIG. 3), the pins 42 will be shifted to their broken line position of FIG. 3, thereby rotating the vane support members 32 through approximately 90° placing the vanes in their vertical position as illustrated at 31a in broken lines in FIG. 3. It will be understood that the motion of the throw bar 41 rotates all of the vanes in unison and return motion of the throw bar leftwardly, as viewed in FIG. 3, will again place the vanes in their closed position wherein their concave face is upward.

Figure 5:
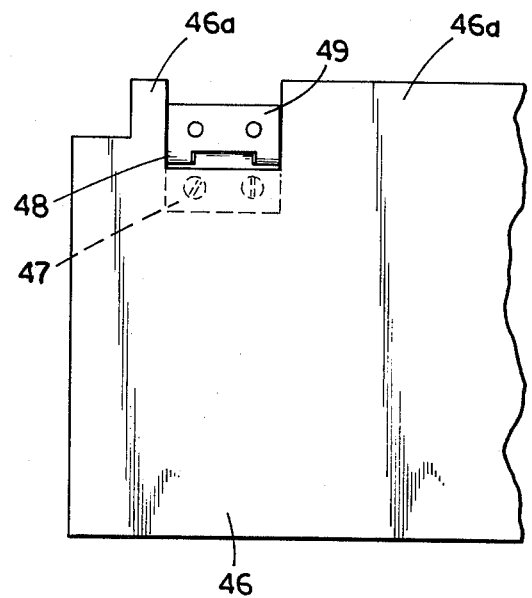
FIG. 5 is an enlarged side view of a skirt panel, visible in FIG. 1, and attached to the frame side members.
Figure 6:
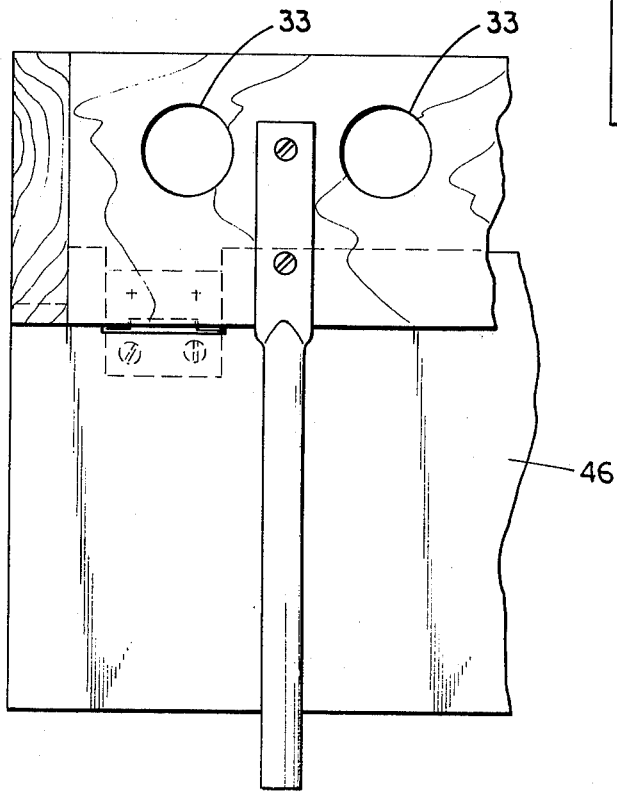
FIG. 6 is a fragmentary view of the skirt panel of FIG. 5 mounting on the adjacent frame member.

As may be seen in FIG. 1, the joined frame members 10 and 11 are provided with generally triangular-shaped end pieces 61 which are fastened, by any suitable means, to the inclined side members of the joined frames. Where the joined frames are arranged end to end so as to overlie a lengthier plantbed, intervening end members 61 may be omitted. Depending from the frame side member 17, and from its counterpart in the frame 11 (not shown) is a skirt panel 46. As may be seen in FIG. 5, the skirt panel 46 has rigidly fastened to it the lower plate of a hinge 47 whose pintle 48 joins it to an upper hinge plate 49. The hinge plate 47 is attached to the panel 46 at an inwardly notched area so that an upper marginal side portion 46a of the panel extends above the hinge. As may be seen in FIG. 7, the upper hinge plate 49 is rigidly attached to the side member 17 so that the skirt panel 46 depends pivotally from the lower margin of the frame member 17 and closes the area between the lower margin of the frame and the plantbed ground line 21. The upwardly extending marginal portion 46a of the skirt panel serves to direct any abnormally large volume of water flowing down the channel formed by the concave face of the vanes 34 to the exterior of the frame (the normal water flow down the vanes will pass through their respective tubes 32 to the exterior). This occurs because the ends of the vanes (engaging the spacers 34) are leftward or outboard of the upper end of the marginal portion 46a of FIG. 7. While the skirt panel 46 is described with reference to FIG. 7 as depending from the frame side member 17, it will be understood, that a similar skirt panel depends from the opposite counterpart (on the frame 11).

Figure 7:
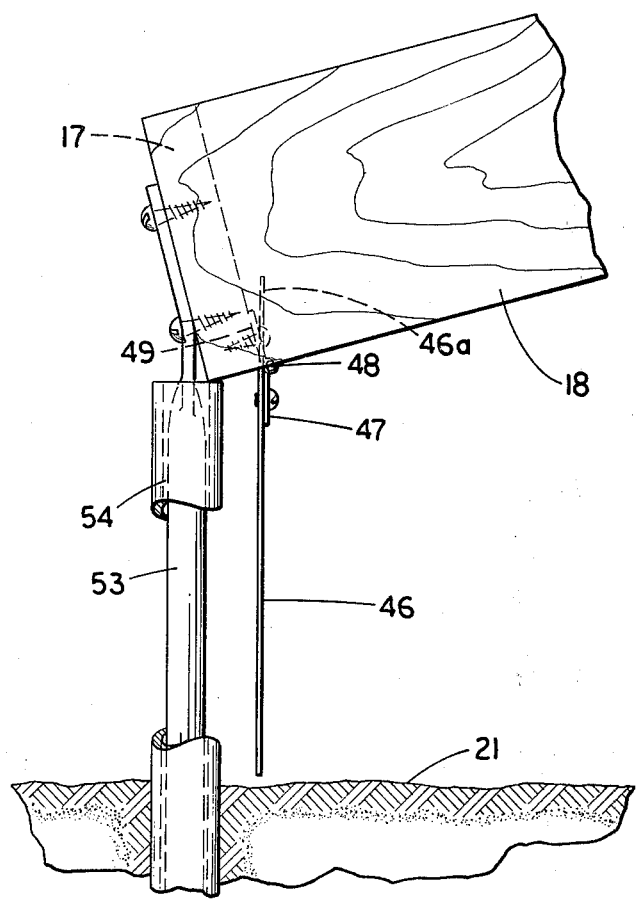
FIG. 7 is a side view of the frame illustrating its support in spaced relation to the plantbed.
Figure 8:
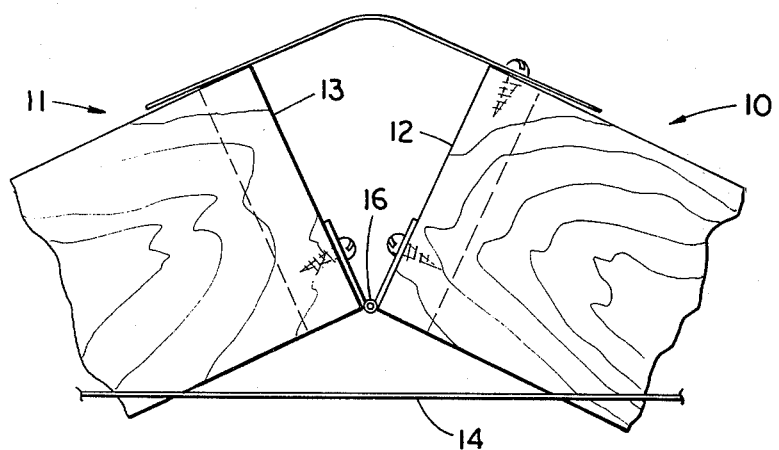
FIG. 8 is a fragmentary end view of the hinged marginal side members of the joined frames.

As may be seen in FIG. 7, at the four corners of the joined frames there is mounted a guide post 53 whose flattened upper end is attached to the frame member by means of screws or other suitable means. The guide posts 53, extending vertically downwardly, are inserted in plastic tubes or pipes 54 driven into the ground to a proper depth. With the frame members resting on the top of the pipe 54, the lower margin of the panel 46 will just clear the ground line. The pipes 54 are driven into the ground at the corners of the plantbed to be protected by the joined frames and this method of locating the frames permits them to be easily removed from over the plantbed by withdrawing the posts 53 from the pipes 54.

The structure above described provides a means for protecting a plantbed, particular useful in the care of tobacco plants before they are transplanted to the fields, the structure permitting air circulation about the plants since, as will be evident from FIG. 2, the vanes 31 do not completely close off circulation through the frames when in closed position because of the spacing between their adjacent marginal edges. The vanes may be placed in their open position, illustrated by broken lines at 31a in FIG. 3 when the plants are small to permit rain or irrigation water to enter the plantbed. The panels are, preferably, of approximately 4 by 8 foot dimension so that when two hinged panels are in place over a plantbed they overlie an approximately 8 by 8 foot section of plantbed. To obtain access to the plantbed for removing the plants, at transplanting time for example, the cover in the form of the two hinged frames may be lifted off the corner pipes 54 and folded together for storage or may be placed on the ground in extended position for return to overlying relation to the bed. The translucent or colorless acrylic plastic from which the vanes are formed permits the plants to be exposed to direct sunlight without damage. In the closed position of the vanes 31 while some air circulation through the frames is permitted, the green-house effect within the frames is such as to create a very humid atmosphere which is conducive to increased growth of the plants.

I claim:

1. A plantbed cover assembly comprising two rectangular frames hingedly joined to each other along one of the marginal side members of each frame and adapted to be supported spaced above a plantbed with the hinged side members above the remaining marginal side members of the frames to thereby dispose both frames in oppositely inclined planes over the plantbed, each of the frames carrying a series of narrow vanes arcuate in cross section and formed of a rigid light-transmitting plastic material, said vanes being arranged parallel to each other and provided with support members which extend from the end of the vanes and freely through journalling apertures in the frame side members, and vane displacing means for rotating said support members in unison through ninety degrees to thereby move said vanes between a first position in which their concave surface faces upwardly and a second position in which their concave surface faces sidewardly, the side margins of adjacent vanes being closely spaced from but not engaging each other when said vanes are in said first position, said vane displacing means comprising a plurality of pins each having an eyelet head and a shank portion, a throw bar extending parallel to and closely adjacent to one of the remaining marginal side members of the frame and resting on said vane support members, the eyelet head of the pins being pivotally attached to the throw bar and the shank portion of each pin extending at an acute angle from the throw-bar and rigidly secured to the extending support member of one of said vanes, whereby as said throw bar is moved upwardly and longitudinally said support members are rotated and the vanes attached thereto are moved between said first and second positions.

2. A plantbed cover as claimed in claim 1 having a skirt panel extending the length of one of the remaining marginal side members of each of the frames and hinged thereto to thus depend from the side members and extend downwardly substantially to the level of the plantbed.

3. A plantbed cover as claimed in claim 2 in which an upper marginal side portion (46a) of each of said skirt panels (46) extends upwardly above said hinged attachment of each of the skirt panels to the frame side members to thereby deflect rain water flowing down the concave upper surface of the vanes to the exterior of the plantbed.

* * * * *